United States Patent [19]

Lederman

[11] 4,400,041
[45] Aug. 23, 1983

[54] UNITIZED SEAL BEARING ASSEMBLY

[75] Inventor: Frederick E. Lederman, Sandusky, Ohio

[73] Assignee: General Motors Corporation, Detroit, Mich.

[21] Appl. No.: 339,189

[22] Filed: Jan. 15, 1982

[51] Int. Cl.³ .................... F16C 19/10; F16C 33/76
[52] U.S. Cl. ............................ 308/219; 308/235; 308/187.1
[58] Field of Search ............ 308/187.1, 187.2, 189 R, 308/193, 233, 235, 219, 232; 277/92, 95, 47, 152, 48, 49, 50

[56] References Cited

U.S. PATENT DOCUMENTS 2,878,084 12/1953 Bermingham .................... 308/187.1
3,870,384 3/1975 Ladin ................................ 308/187.2
4,120,543 10/1978 Greene, Jr. et al. ................ 308/233

Primary Examiner—Stuart S. Levy
Assistant Examiner—David Werner
Attorney, Agent, or Firm—Patrick M. Griffin

[57] ABSTRACT

A unitized sealed thrust bearing includes two annular races with a complement of bearing balls therebetween. One race includes an axially inwardly extending central cylindrical flange and the other race includes a pair of elastomeric sealing lips, one bonded to the outer edge and one bonded to the inner edge. The central flange includes an unobstructed radially inwardly facing wall and a radially outwardly facing wall with a radially and axially inwardly facing sealing surface terminating in a radially outwardly extending rib. The inner sealing lip includes an outer sealing wall which slopes axially and radially inwardly at a greater angle than the sealing surface, in its undeformed state, and an axially inwardly facing shoulder at the terminus thereof. As the races are moved axially together during assembly, the sealing wall of the inner lip flexes as it slides past the rib and into engagement with the sealing surface, the shoulder moves adjacent the rib, and the outer sealing lip engages the other race. Axial movement of the races apart engages the shoulder with the rib to compress the inner lip and retain the races.

2 Claims, 3 Drawing Figures

UNITIZED SEAL BEARING ASSEMBLY

BACKGROUND OF THE INVENTION

This invention relates generally to anti-friction bearings and more particularly to a unitized sealed thrust bearing assembly.

Angular contact thrust bearings designed to carry high, axially directed thrust loads may be manufactured economically from stamped annular metal races which are heat treated with the confronting curvilinear raceways thereof left unground. It is necessary to seal the races to retain the lubricant, and it is desirable to create a unitized assembly in which the races are held together prior to incorporation of the bearing into some other assembly.

The patent to Greene Jr. et al U.S. Pat. No. 4,120,543 shows an angular contact thrust bearing for a McPherson type strut in which an elastomeric sealing lip on the inner edge of one race snaps over the inner edge of the other race to both seal the inner edges of the two races and to retain the races together as a unitized assembly. In some applications, however, it is desirable to have a bearing in which one of the angular races has an axially extending cylindrical flange at the inner edge thereof which extends for the entire axial thickness of the bearing assembly to provide an unobstructed metal tunnel at the center of the bearing assembly. It is not possible with such an assembly to have an elastomeric lip engage this central tunnel without obstructing it. It is known to unitize such an assembly with a separate metal ring which is press fitted around the cylindrical flange and seats against a sealing lip on the other race to prevent the races from separating. It is desirable from the standpoint of manufacturing ease to eliminate the separate ring.

SUMMARY OF THE INVENTION

The subject invention provides a sealed and unitized angular contact bearing assembly in which an elastomeric sealing lip on the first of two annular races snap assembles with a central cylindrical flange on the second race to provide a sealed unitized bearing assembly without obstructing the central axial tunnel provided by the cylindrical flange.

The first bearing race has a radially outwardly directed flange at the outer edge thereof and axially extending central cylindrical flange at the inner edge thereof with a curvilinear raceway therebetween. The cylindrical flange has a radially outwardly facing wall and a radially inwardly facing wall providing the central axial tunnel. The radially outwardly facing wall further includes a retention groove providing a sealing surface sloped axially and radially inwardly of the bearing assembly axis and a radially outwardly extending retention rib at the axial inward terminus of the retention groove.

The second bearing race includes a curvilinear raceway in confronting relation to the raceway of the first race, with a complement of bearing balls engaged therebetween. The second bearing race further includes first and second elastomeric sealing lips bonded respectively to the outer and inner edges thereof. The first sealing lip is sealingly engageable with the flange at the outer edge of the first race, and the second sealing lip is deflectable and has an outer wall which, in its undeformed state, is sloped in the same direction as the sealing surface of the first race and at a greater angle to the bearing assembly axis. The outer wall of the second sealing lip terminates in an axially inwardly facing shoulder which, in its undeformed state, has a diameter slightly smaller than the minimum diameter of the sealing surface on the first race.

When the two bearing races are moved coaxially together during assembly, the second sealing lip is deflected radially outwardly as the outer wall thereof slides axially past the retention rib. The second sealing lip moves into sealing contact with the sealing surface of the first race as the retention shoulder moves axially past and adjacent the retention rib and the first sealing lip simultaneously moves into sealing contact with the first race. Thereafter, any axial movement tending to separate the races engages the retention shoulder with the retention rib to jam or compress the second sealing lip. Such lip and the retention rib thus act in effect as a one way gate to prevent axial separation of the races and maintain them as a unitary assembly.

It is, therefore, an object of the invention to provide a sealed and unitized bearing assembly in which an elastomer sealing lip on one race sealingly engages the outer wall of a central cylindrical flange on the other race as well as cooperating with a retention rib thereon to maintain the races as a unitized bearing assembly.

It is another object of the invention to provide such a unitized assembly without the necessity of any retention members separate from the races themselves.

BRIEF DESCRIPTION OF THE DRAWING

These and other objects of the invention will be apparent from the following written description and drawing in which.

DESCRIPTION OF THE PREFERRED EMBODIMENT

Figure 1:
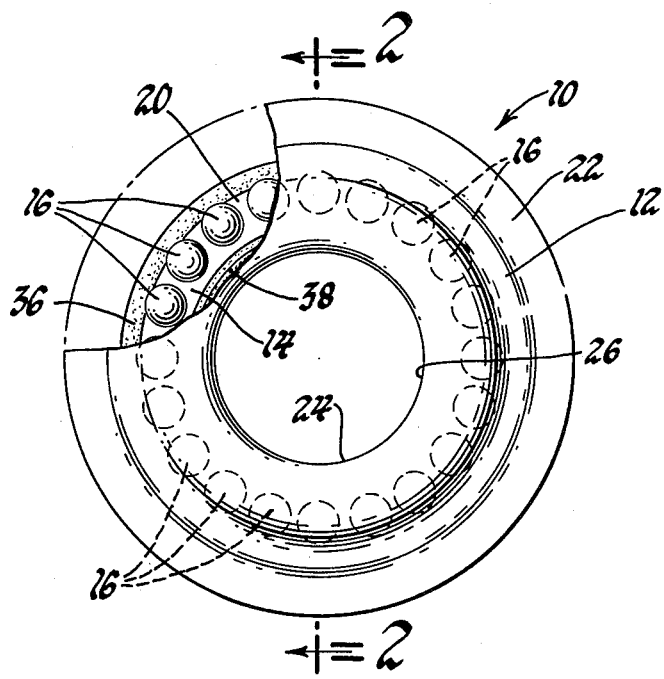
FIG. 1 is a front view partially broken away of the unitized sealed thrust bearing assembly of the invention.
Figure 2:
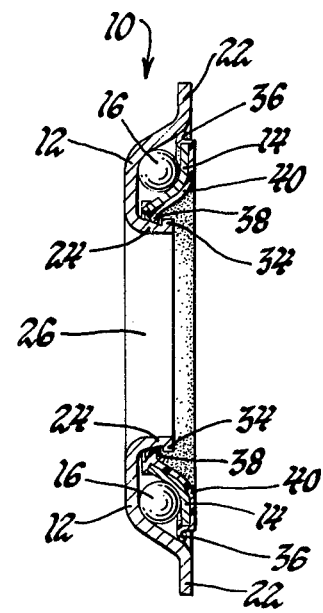
FIG. 2 is a sectional view taken along the line 2—2 of FIG. 1.

Referring first to FIGS. 1 and 2, the bearing assembly designated generally at 10 includes a first annular race 12 and a second annular race 14 with a full complement of bearing balls 16 therebetween. Races 12 and 14 are metal stampings and each has a curvilinear raceway therein designated respectively 18 and 20 which engage bearing balls 16 at a contact angle $\alpha$ of approximately 30° relative to the axis of bearing assembly 10. Races 12 and 14 are heat treated and raceways 18 and 20 are left unground. Bearing assembly 10 is unitized and sealed as is described further below.

The first race 12 includes an outer radially extending flange 22 integral with the outer side of raceway 18 and an inner cylindrical flange 24 integral with the inner side of raceway 18 and extending axially inwardly of bearing assembly 10 for substantially the entire axial thickness thereof. Flange 22 serves as a structural member to attach the bearing assembly 10 to another structure, such as an elastomer pad in a McPherson strut, and could be of other shape or eliminated. Cylindrical flange 24 has a radially inwardly facing inner wall 26 and a radially outwardly facing outer wall 28, best seen in FIG. 3. After flange 22, raceway 18 and flange 24 of race 12 are stamped in a first operation, the axially innermost edge portion of wall 28 is upset to form a retention groove 30 having an axially and radially inwardly sloping annular sealing surface 32 and a radially outwardly extending retention rib 34 at the axial inward terminus of sealing surface 32 formed from the metal removed from wall 28 to form surface 32. Wall 26 provides a central, continuous axial tunnel which can receive the piston rod of a McPherson strut or can contain part of the elastomer pad of a McPherson strut. Since wall 26 must therefore be unobstructed, only wall 28 cooperates in the retention of races 12 and 14, as will be described below.

Figure 3:
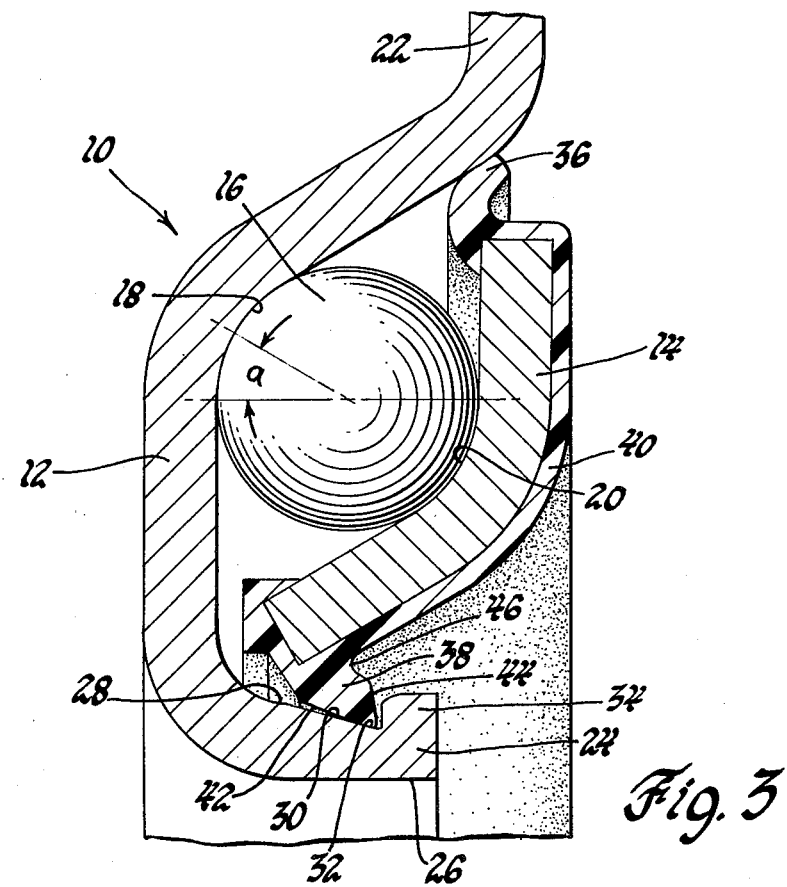
FIG. 3 is an enlargement of a portion of FIG. 2.

Referring now to FIGS. 2 and 3, second race 14 includes a first elastomeric sealing lip 36 at the outer edge thereof, a second elastomeric sealing lip 38 at the inner edge thereof and a thin outer layer or cover of elastomer 40 integral with lips 36 and 38. Layer 40 creates an effective frictional engagement between the outside of race 14 and another structural member, such as the spring seat of a McPherson strut. Sealing lip 38 has a generally frustoconical cross-section and includes an outer sealing wall 42, an axially inwardly facing retention shoulder 44 and an annular relieved portion 46 at the juncture with layer 40. In the undeformed state of lip 38, wall 42 is sloped in the same direction as sealing surface 32 but at a larger angle with respect to the axis of the bearing assembly, while retention shoulder 44 is generally perpendicular to the axis and has a diameter slightly smaller than the minimum diameter of sealing surface 32 adjacent rib 34. Annular relieved portion 46 allows lip 36 to easily deflect in a radially outward and axially inward direction.

As race 14 is moved coaxially toward race 12 during assembly, lip 38 is deflected radially outwardly and axially inwardly by the engagement of wall 42 with the retention rib 34 as the lip slides past the rib. When wall 42 moves completely past rib 34, it snaps into sealing engagement with sealing surface 32 and retention shoulder 44 moves adjacent retention rib 34. Simultaneously, sealing lip 36 sealingly engages race 12 and the assembly of bearing assembly 10 is completed. Both sealing lips 36 and 38 remain under a slight deformation and act as land riding seals.

Sealing lip 38 and rib 34 retain the races 12 and 14 as a unitized assembly. After assembly, any force tending to axially separate races 12 and 14 will engage the axially inwardly facing retention shoulder 44 with retention rib 34 to jam or compress sealing lip 38.

Therefore, the invention provides a sealed and unitized bearing assembly in which one of the sealing lips sealingly engages the outer wall of the central cylindrical flange as well as cooperates with a retention rib thereon to maintain the races as a unitized assembly without the use of any retention members apart from the races themselves.

The embodiments of the invention in which an exclusive property or privilege is claimed are defined as follows:

1. An unitized, sealed thrust bearing assembly, comprising,
a first bearing race including a curvilinear raceway and a cylindrical flange extending axially inwardly of the bearing assembly at the inner edge thereof,
the cylindrical flange including an inner, radially inwardly facing wall and an outer, radially outwardly facing wall, the outer wall having a sealing surface sloped axially and radially inwardly with respect to the bearing assembly axis and a radially outwardly extending retention rib at the axially inward terminus of the sealing surface,
a second bearing race coaxial with the first race and having a curvilinear raceway in confronting relation to the raceway of the first race with a complement of bearing balls therebetween, the second race having a first elastomeric sealing lip engageable with the first race and a second axially inwardly deflectable conical sealing lip having an outer wall sloped in the same direction as the sealing surface and at a greater angle with respect to the bearing assembly axis in the undeformed state, and terminating in an axially inwardly facing shoulder,
relative coaxial movement of the bearing races together during assembly deflecting the second sealing lip axially inwardly as the outer wall of the second sealing lip slides axially past the retention rib and into sealing engagement with the sealing surface and the retention shoulder moves adjacent the retention rib, axial movement tending to separate the bearing races engaging the retention shoulder with the retention rib to conically compress said sealing lip against the second race and prevent flexing of the lip past the retention rib to maintain the races as a unitary assembly.

2. A unitized, sealed thrust bearing assembly comprising:
a first bearing race having an axially inwardly extending cylindrical flange at the inner edge thereof,
said cylindrical flange including a radially outwardly facing sealing surface sloped axially and radially inwardly with respect to the bearing assembly axis and terminating in a radially outwardly extending retention rib,
a second bearing race coaxial with the first race and spaced therefrom by a complement of bearing balls,
said second race having a generally conical elastomeric retention and sealing lip bonded thereto extending radially and axially inward with respect to the bearing assembly axis,
said lip including a wall sloped in the same general direction as the sealing surface and sealingly engageable with such surface, the lip terminating in a retention shoulder axially facing the retention rib and normally spaced axially therefrom,
relative coaxial movement of the bearing races tending to separate the bearing races axially engaging the retention shoulder with the retention rib and applying a resultant force generally radially and axially outward through the sealing lip to compress said lip against the second race and prevent flexing of the lip past the retention rib and separation of the bearing races.

* * * * *